United States Patent
Christiansen (10) Patent No.: US 10,053,149 B1
(45) Date of Patent: Aug. 21, 2018

(54) STATIC STEERING WINDUP REDUCTION

(71) Applicant: Ford Global Technologies, LLC, Dearborn, MI (US)

(72) Inventor: Jens Christiansen, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/422,711

(22) Filed: Feb. 2, 2017

(51) Int. Cl.
| | |
|---|---|
| *B62D 5/04* | (2006.01) |
| *B62D 15/02* | (2006.01) |
| *B60W 30/12* | (2006.01) |
| *B62D 6/00* | (2006.01) |
| *B62D 3/12* | (2006.01) |

(52) U.S. Cl.
CPC ............ *B62D 15/025* (2013.01); *B62D 5/04* (2013.01); *B62D 6/002* (2013.01); *B62D 15/024* (2013.01); *B62D 3/12* (2013.01)

(58) Field of Classification Search
CPC ............. B62D 5/0465; B62D 15/0285; B62D 5/0463; B60W 30/12
See application file for complete search history.

(56) References Cited

U.S. PATENT DOCUMENTS

| | | | |
|---|---|---|---|
| 6,380,706 | B1 | 4/2002 | Kifuku et al. |
| 7,084,593 | B2 | 8/2006 | Crowley |
| 8,660,752 | B2 | 2/2014 | Nishimura |
| 8,874,315 | B2 | 10/2014 | Kariatsumari et al. |
| 8,972,115 | B1 | 3/2015 | Oh |
| 2006/0124221 | A1* | 6/2006 | Richards ............... B60C 9/08 152/560 |
| 2008/0154462 | A1 | 6/2008 | Yamamoto |
| 2012/0101683 | A1* | 4/2012 | Nishimura ........... B62D 5/0463 701/41 |
| 2012/0226417 | A1* | 9/2012 | Nishikawa ........... B60T 8/1755 701/42 |
| 2015/0134201 | A1 | 5/2015 | Lavoie |
| 2016/0075369 | A1* | 3/2016 | Lavoie ............... B62D 15/0285 180/446 |

FOREIGN PATENT DOCUMENTS

| | | |
|---|---|---|
| JP | 2005329751 A | 12/2005 |
| JP | 5011785 B2 | 8/2012 |
| JP | 5396119 B2 | 1/2014 |
| KR | 101612364 B1 | 4/2016 |

OTHER PUBLICATIONS

UK Search Report dated Jun. 27, 2018 re: GB Appl. No. 1801610.5.

\* cited by examiner

*Primary Examiner* — Yonel Beaulieu
*Assistant Examiner* — Martin A Weeks
(74) *Attorney, Agent, or Firm* — Frank A. MacKenzie; Bejin Bieneman PLC (57) ABSTRACT

A vehicle includes a steering system. The steering system pivots a wheel of a vehicle to a first road wheel angle relative to a starting position. The steering system pivots the vehicle wheel to a second road wheel angle calculated to reduce a tire windup upon determining that the vehicle is stationary. The steering system pivots the vehicle wheel to a final road wheel angle upon determining that a vehicle motion is either incipient or initiated.

20 Claims, 9 Drawing Sheets

STATIC STEERING WINDUP REDUCTION

BACKGROUND

Motor vehicles using electric motors to steer vehicles, including electric motors providing power assist to humans steering vehicles, should avoid overheating the motors. Overheated motors may experience a diminished ability to provide torque. Sustaining vehicle wheels in a steering position against a tire-generated windup torque load may require enough energy from the motor that, when maintained, may overheat the motor.

DETAILED DESCRIPTION

Introduction

A vehicle includes a steering system. The steering system pivots a wheel of a vehicle to a first road wheel angle relative to a starting position. The steering system pivots the vehicle wheel to a second road wheel angle calculated to reduce a tire windup upon determining that the vehicle is stationary. The steering system pivots the vehicle wheel to a final road wheel angle upon determining that a vehicle motion is either incipient or initiated.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a driver seat, facing a dashboard. In the Figures, like numerals indicate like parts throughout the several views.

Example System Elements

With reference to FIGS. 1 through 6, an example steering system 10 allowing a reduction of a static steering windup is disposed in an example vehicle 12. Front wheels 14, each wheel 14 having a tire 15 best seen in FIGS. 4 and 5 mounted thereon, are connected to the steering system 10. Wheels 14 may be positioned to a road wheel angle α by the steering system 10. Tire 15 defines a tire patch 16 of a circumferential tire tread 17 conforming to the shape of the ground at the tire patch 16. Sidewalls 18 of the tire 15 connect the tire patch 16 with the wheel 14. The tire patch 16 torsionally resists a change in the road wheel angle α when tire 15 is not rolling. Such resistance results in a windup of tire 15, i.e. torsional deformation of tire 15 between the wheel 14 and the tire patch 16 about an axis substantially centered on the patch 16 and normal to the ground.

The tire patch 16 is a transitory portion of the tire tread 17 of the rolling tire 15, i.e., a portion of the tread 17 in contact with the ground at a particular instant in time. The tire patch 16 moves along the tread 17 as the tire 15 rotates, i.e., the portion of the tread 17 comprising the patch 16 is continually changing as the part of the tread 17 engaging the ground changes.

Figure 5:
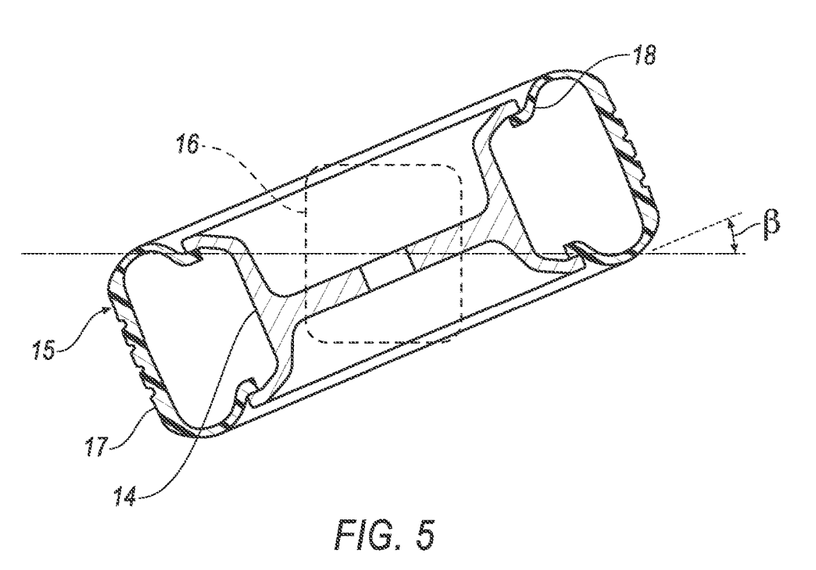
FIG. 5 is a section taken through a plane passing through a center of the tire and wheel of FIG. 4 in the direction of arrows 5.
Figure 6:
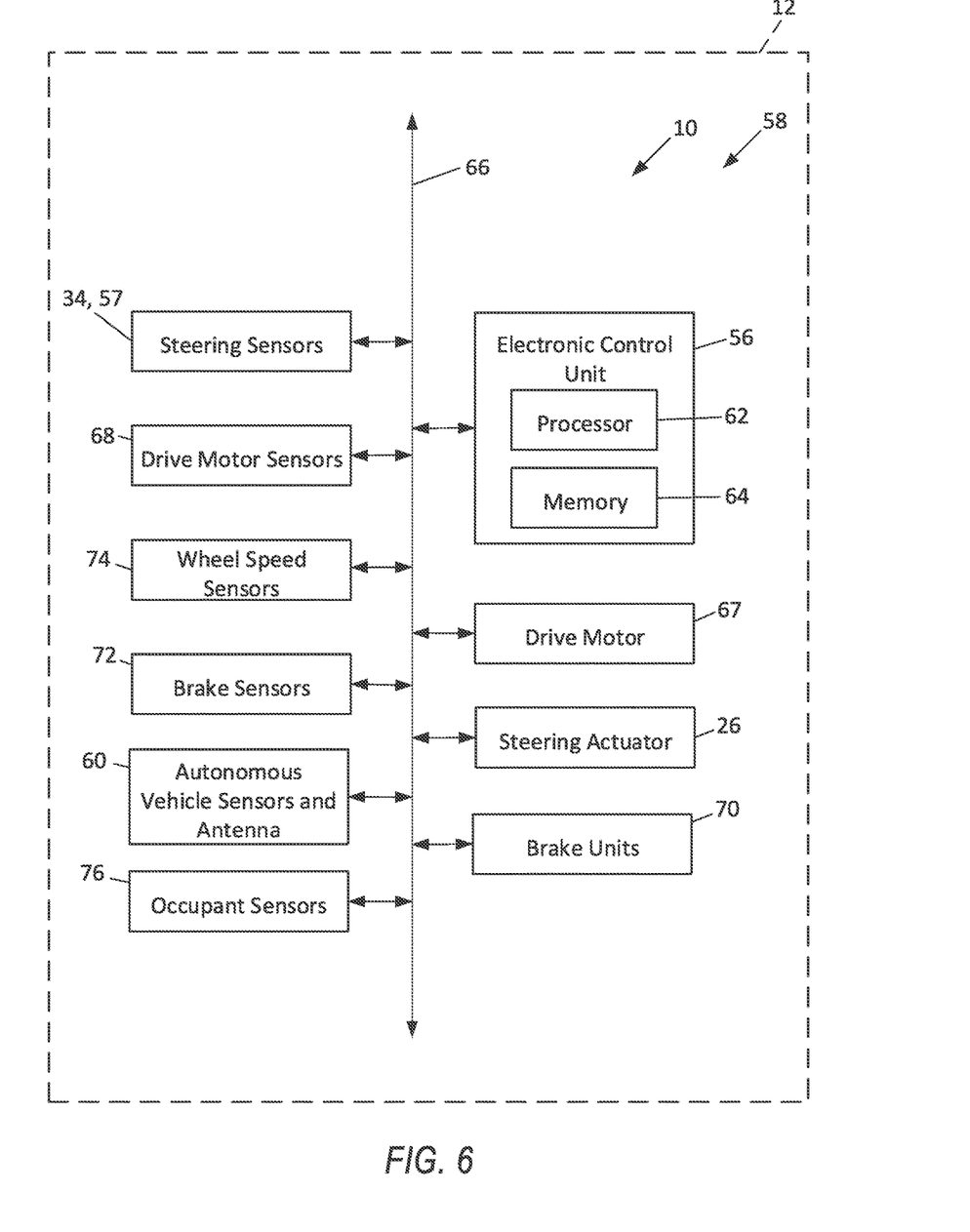
FIG. 6 is a block diagram illustration of an example static windup reduction system.

The tire patch 16, like the wheel 14, has an angular orientation relative to a longitudinal axis of the vehicle as best seen in FIG. 5. The angular orientation of the tire patch 16 may differ from the road wheel angle α by a windup angle β. Such a difference may develop when the wheels 14 are turned by the steering gear 21 while the vehicle 12 is stationary and the tire patch 16 resists such movement. FIG. 5 exaggerates the difference for ease of illustration. An example maximum magnitude of windup angle β, i.e., the maximum windup, between the tire patch and the wheel 14 may be three degrees.

The maximum windup and an associated resistance torque may be limited by tire slip at an interface between the tire patch 16 and the ground surface. The torque at which such slip occurs, i.e., the limit of torque, depends on a plurality of factors including a weight or force applied to the tire 15 by vehicle 12, a coefficient of friction between the tire patch 16 and the ground surface, a size in units of area of the tire patch 16, and a shape, i.e., a length and a width of the tire patch. A commonly used static coefficient of friction between tires and dry concrete is 1.0. When the tires 15 are on a surface with a low coefficient of friction, such as wet ice, the resistance will be very low, e.g., 0.10.

Within the limit of torque, the magnitude of resistance may vary with the combination of the angle β and the resistance of the tire 15 against windup. Sidewalls 18 may resiliently deflect relative to each of the tire patch 16 and the wheel 14, allowing movement therebetween. The torsional stiffness of the tire 15 may depend on a structure of the tire 15, e.g. a height and thickness of sidewalls 18 of the tire 15 and a width of the tire 15. A width of the tire tread 17 affects a torsional moment arm of the tire resisting deflection.

The windup is relieved when the tires 15 are allowed to roll. Rolling allows the tire patch 16 to be reset as a different part of the tread 17 defines and resets the tire patch 16.

Steering system 10 may be connected in part directly to a vehicle 12 structure, such as a vehicle 12 body or a vehicle 12 frame or subframe, all of which are well known. Steering system 10 may also be connected in part to a vehicle 12 front suspension which commonly includes a lower control arm (not shown).

Vehicle 12 also includes rear wheels 19, each also typically including a tire, which may be attached to a rear axle 20. Rear axle 20 may be connected to a rear portion of the vehicle 12 structure such as a rear portion of the vehicle 12 body or the vehicle 12 frame or subframe by a rear suspension (not shown). In alternative configurations, such as with an independent rear suspension, a rear axle may not be included and the rear wheels 19 may be mounted to rear suspension knuckles through wheel bearings. The rear suspension and wheel mounting are not critical to the presently described steering system.

Figure 3:
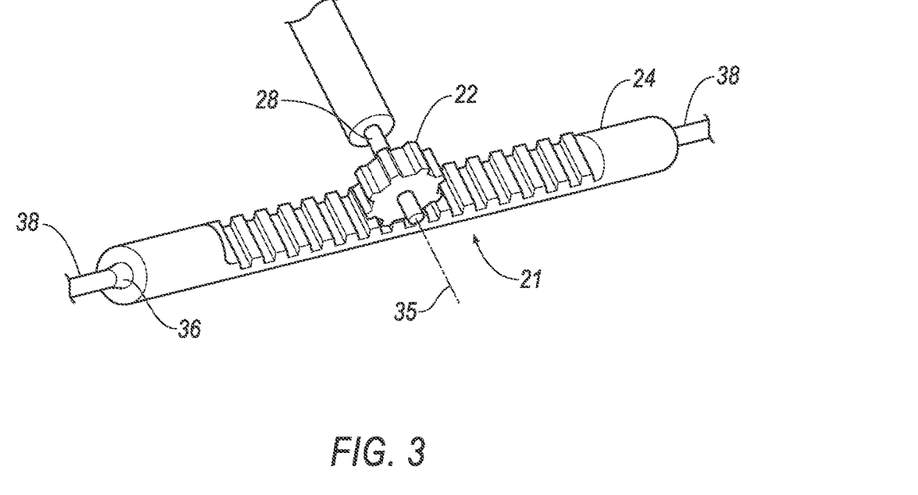
FIG. 3 is a perspective view of an example rack and pinion steering gear arrangement.

A rack and pinion steering gear 21 is illustrated as part of example steering system 10. The example steering gear 21 includes a pinion gear 22 and a rack 24 as best shown in FIG. 3. Alternatively, a Pitman arm linkage may be employed in combination with recirculating ball mechanism. Yet alternatively, discrete and separate steering actuators may be placed at each of the front wheels to allow steering without an intervening steering linkage. It will be understood that any of the foregoing alternatives could be used; for purposes of better understanding ideas in this description, the rack and pinion steering gear arrangement is described.

A steering actuator 26 is drivingly connected to the pinion gear 22 by a lower steering column 28. The example the steering actuator 26 includes an electric motor to provide a steering force. As used herein, the term steering force is descriptive of a force used to axially displace a part of the steering linkage. It is known to translate a steering force to a steering torque and steering torque to steering force through mechanisms including rack and pinion gear sets and through lever arm arrangements. References to either steering torques or steering forces are not intended to be exclusive of the other.

A steering wheel 30 may be connected to the lower steering column 28 through an upper steering column 32 and the steering actuator 26. The steering wheel 30 and the upper steering column 32 may be omitted in a fully autonomous vehicle. A rack displacement transducer or sensor 34 may be connected in part to the rack 24 for measuring a lateral displacement of the rack 24. The rack displacement sensor 34 may be in the form of a rotation sensor associated with the pinion gear 22, as displacement of the rack 24 will vary linearly with rotation of the pinion gear 22 about an axis 35. The tooth count on the pinion gear 22 together with a tooth pitch determines a functional relationship between rotational displacement of the pinion gear 22 drivingly engaged with the steering rack 24 and the displacement of the rack 24. The sensor 34 may be used to determine both a displacement of the rack 24 and a velocity of displacement of the rack 24.

Inner tie rod ball joints 36 at opposite ends of the rack 24 may pivotably connect tie rods 38 to rack 24. Outer tie rod ball joints 40 may pivotably connect the tie rods 38 to a left steering knuckle 42 on a left side of the steering system 10 and to a right steering knuckle 44 on a right side of steering system 10. The knuckles 42 and 44 may each be respectively pivotably connected by a suspension ball joint 46 to a left lower control arm (not shown) and a right lower control arm (not shown). The control arms comprise part of the front suspension and are connected to the vehicle structure. The left knuckle 42 may have a left steering arm 48 extending between the left side outer tie rod ball joint 40 and the suspension ball joint 46. The right knuckle 44 may have a right steering arm 50 extending between the right side outer tie rod ball joint 40 and the suspension ball joint 46. A wheel bearing 52 is mounted to each of the knuckles 42 and 44. A spindle 54 is rotatably supported by each bearing 52, allowing rotation of spindle 54 relative to the knuckles 42 and 44. The spindles 54 are each rotatably fixed to one of the front wheels 14.

Rotation of the lower steering column 28 pivots the knuckles 42, 44 and the wheels 14. Rotation of the lower steering column 28, through the engagement of the pinion gear 22 and the rack 24, laterally displaces the rack 24. Lateral displacement of the rack 24 displaces the tie rods 38 which pivot the steering arms 48 and 50 of the knuckles 42 and 44 about the ball joints 46. The knuckles 42, 44 may be additionally pivotably supported by the upper ball joints mounted to the upper control arms (not shown) or to a strut assembly (not shown) in a known manner. The wheels 14 are pivoted about the ball joints 46 responsive to the displacement of the steering knuckle steering arms 48, 50.

Figure 1:
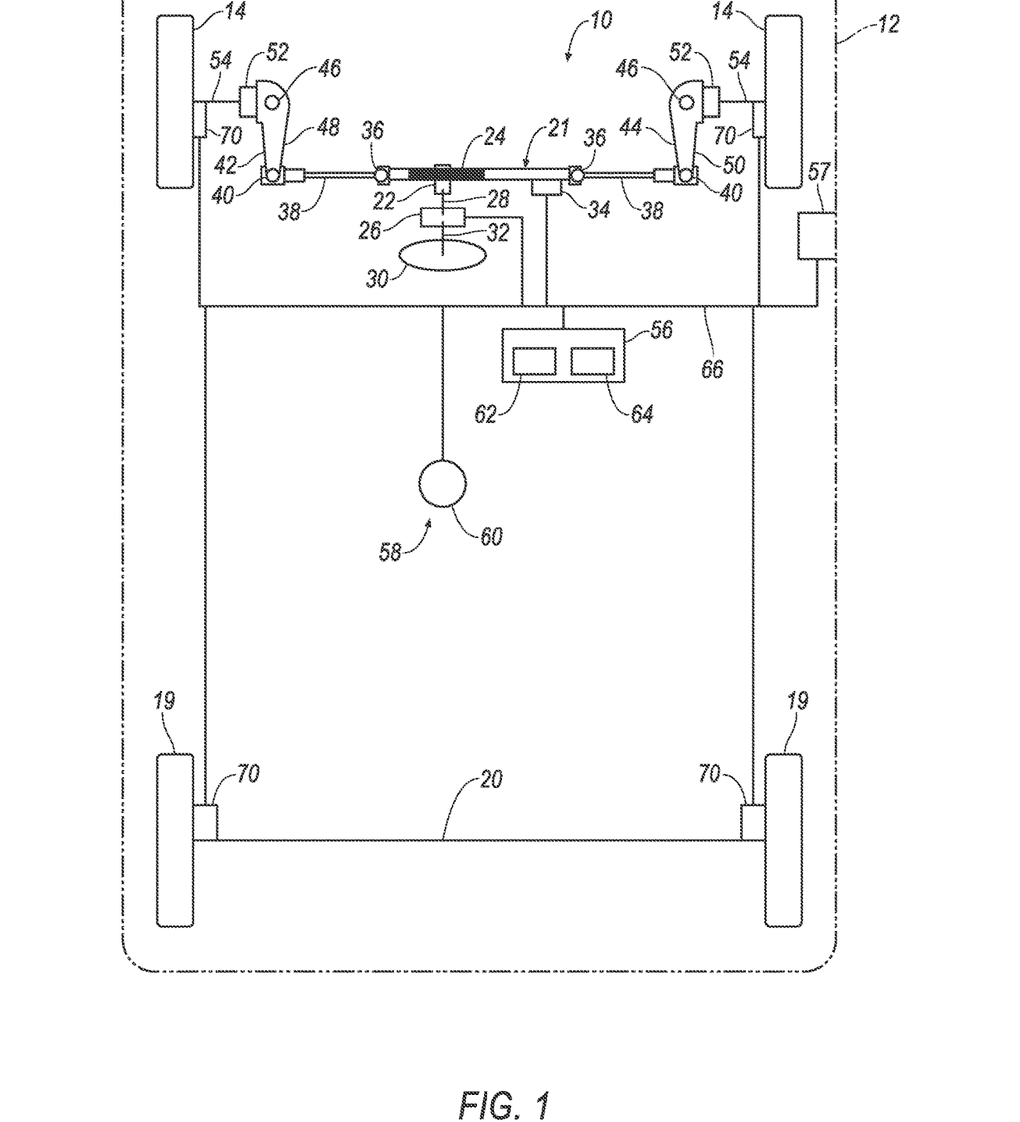
FIG. 1 is a schematic view of a vehicle including an example steering system with the front wheels in a first steering orientation.
Figure 2:
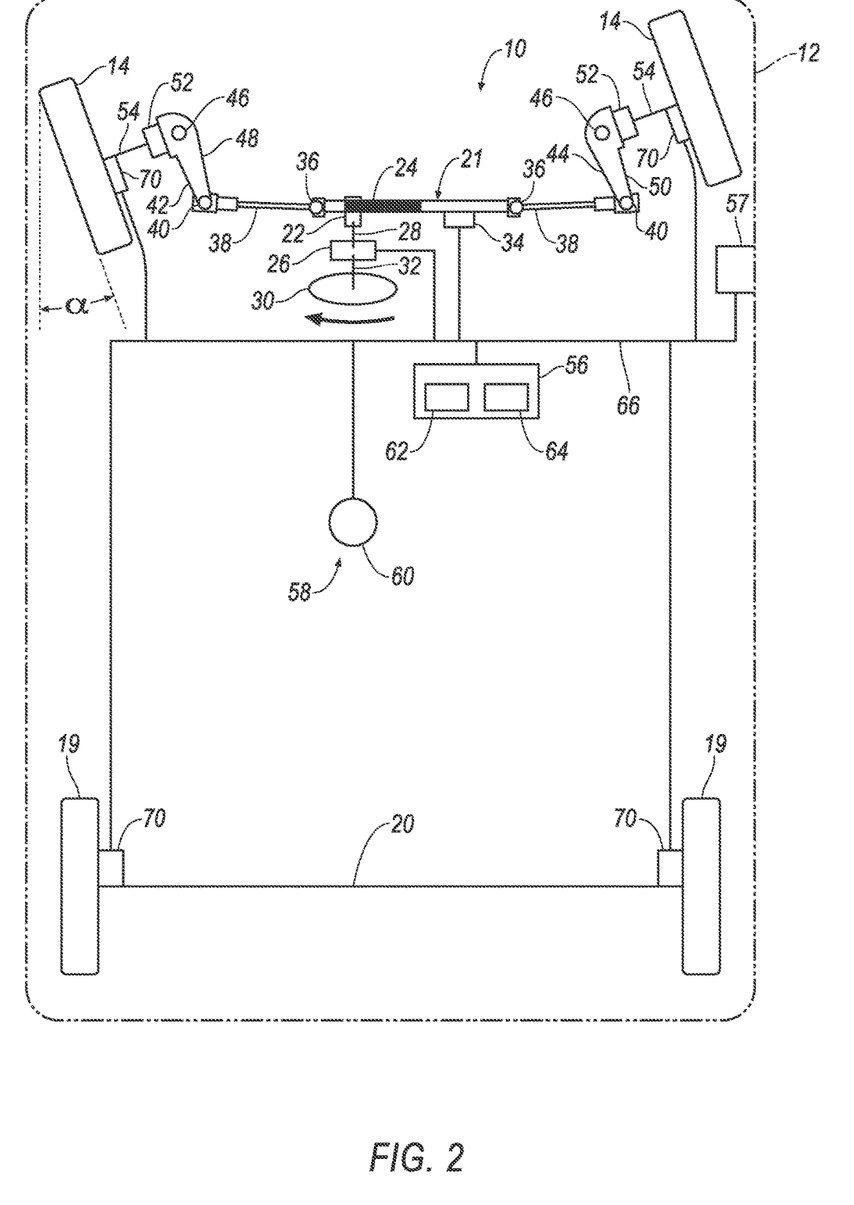
FIG. 2 is a schematic view of the vehicle and steering system of FIG. 1 with the front wheels in a second steering orientation.

FIG. 1 illustrates the wheels 14 and the steering system 10 in a first orientation with the wheels 14 in a straight-ahead orientation for driving the vehicle 12 in a straight line. FIG. 2 illustrates the wheels 14 and the steering system 10 in a second orientation with the wheels 14 in a left-turn orientation for driving vehicle 12 in a left-directed arc. The inside or left wheel 14 is illustrated as being positioned at an angle $\alpha$ to the straight-ahead position of FIG. 1. The left or inside wheel 14 in FIG. 1 has an angle $\alpha$ of 0°. The angle of the right wheel 14 in FIG. 2 may be less than the angle of the left wheel for a left turn, as the outboard tire will be tracking a slightly larger radius than the inside tire to avoid tire scrubbing. Such a variation in road wheel angle is known in the art, and may be provided by an example Ackerman linkage as is known.

The system 10 also includes a computing device e.g., an electronic control unit ("ECU") 56. The vehicle 12 may be an autonomous vehicle (as that term is defined below), having a pilot system 58. The pilot system 58 may include a plurality of sensors and a plurality of actuators, connected to the ECU 56.

The sensors of the pilot system 58 may include a plurality of vehicle situational awareness sensors or autonomous vehicle sensors ("AV sensors") 60. The AV sensors 60 may include sensors mounted inside a vehicle passenger cabin, and may additionally be mounted outside of the vehicle on a roof of the vehicle or in a fascia of the vehicle 12. A preferred location may depend on the type of sensor. An identification of several example types of sensors that may be used is provided below.

Figure 4:
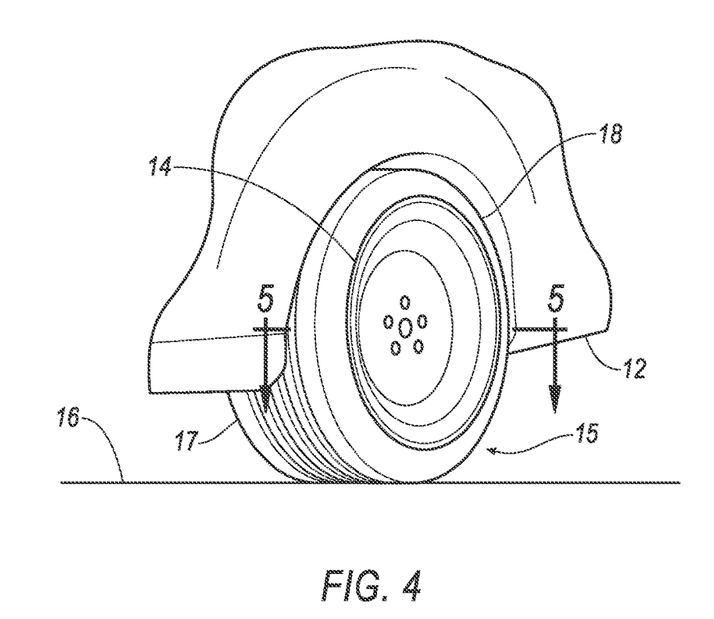
FIG. 4 is a broken-out view of a tire and wheel installed in a vehicle and oriented at an angle relative to a longitudinal axis of the vehicle.

The ECU 56 may be comprised of a single computing device or computer, as suggested by FIGS. 1, 2 and 4, or may alternatively be comprised of a plurality of computers (e.g., ECUs), including, for example, a powertrain computer, itself potentially comprising an engine computer and a transmission computer, an infotainment computer, a chassis systems computer, a restraint system computer, a vehicle security computer, and so on. The ECU 56 (or each computer comprising the ECU 56) includes an electronic processor 62 and an associated memory 64.

The system 58 may further include a vehicle network 66 including one or more wired and/or wireless communications media such as an example system Control Area Network ("CAN") bus or a Local Interconnect Network ("LIN") or other communications interface. The network 66, as illustrated in FIG. 4, provides a transmission media between and connecting elements of the steering system 10 and the pilot system 58 including the ECU 56 and components and ancillary systems including, by way of example, a drive motor 67, drive motor sensors 68, a plurality of brake units 70, brake sensors 72, wheel speed sensors 74 associated with the wheels 14, 19, a steering actuator 26, steering sensors e.g. rack displacement sensor 34 and lateral acceleration sensor 57, occupant sensors 76, turning signals (not shown), and/or the vehicle situational awareness sensors 60.

Each of the wheels 14, 19 may be associated with one of the brake units 70. The wheel speed sensors 74 may be integrated into the brake units 70. The steering actuator 26 and the associated steering sensors 34, 57 are incorporated into the steering system 10. The drive motor 67 may, by way of example, be an internal combustion engine providing all propulsive power, or may be in combination with an electric motor, i.e., a so-called hybrid powertrain, or may be an electric motor providing all propulsive power, or may be a plurality of electric motors collectively providing all propulsive power. The drive motor 67 may or may not include or be coupled to a transmission providing torque and speed ratios. The drive motor 67 may be a single unit near a front of vehicle 12, or the drive motor 67 may alternatively be located elsewhere in the vehicle 12.

Each of the drive motor 67, the brake units 70, and the steering actuator 26 are illustrated as connected directly to the ECU 56 through the network 66, but may alternatively or additionally be connected directly to the ECU 56. Each of the drive motor 67, the brake units 70, and the steering actuator 26 may include a respective electronic controller that receives instructions from the ECU 56.

The memory 64 of the ECU 56 includes one or more forms of computer-readable media, and stores instructions executable by the processor 62 for performing various operations, including such operations as disclosed herein. The processor 62 may read and execute such instructions. The ECU 56 includes programming to autonomously operate autonomous the vehicle 12 in a fully autonomous mode.

For purposes of this disclosure, the term "autonomous vehicle" is used to refer to a vehicle operating in the fully autonomous mode. The fully autonomous mode is defined as one in which each of vehicle 12 propulsion (typically via a powertrain including the drive motor 67 as defined herein), braking, and steering are controlled by ECU 56 under substantially all circumstances. In a semi-autonomous mode, one or two of these are controlled by the ECU 56, and in a non-autonomous mode, none of them are.

The memory 64 of the ECU 56 also stores data. Data may include collected data that is collected from a variety of devices. In general, collected data may include any data from a map database, and any data that may be gathered by any data collection device including the drive motor sensors 68, the wheel speed sensors 74, the steering sensors 34, 57, the occupant sensors 76, the AV sensors 60, and/or data computed from such data. Example AV sensors 60 may include vehicle context and position sensors and location sensors such as a radar sensor, a LIDAR sensor, a vision sensor (e.g., a camera), a global positioning system ("GPS") sensor, antennae and the like. Radar sensors may be used both for locating other objects, and for, by exploiting the Doppler effect, determining a relative velocity of such other objects. The foregoing examples are not intended to be limiting. Other types of data collection devices may be used to provide data to the ECU 56. Data may also include calculated data calculated in the ECU 56 from collected data and from other calculated data.

Figure 7A:
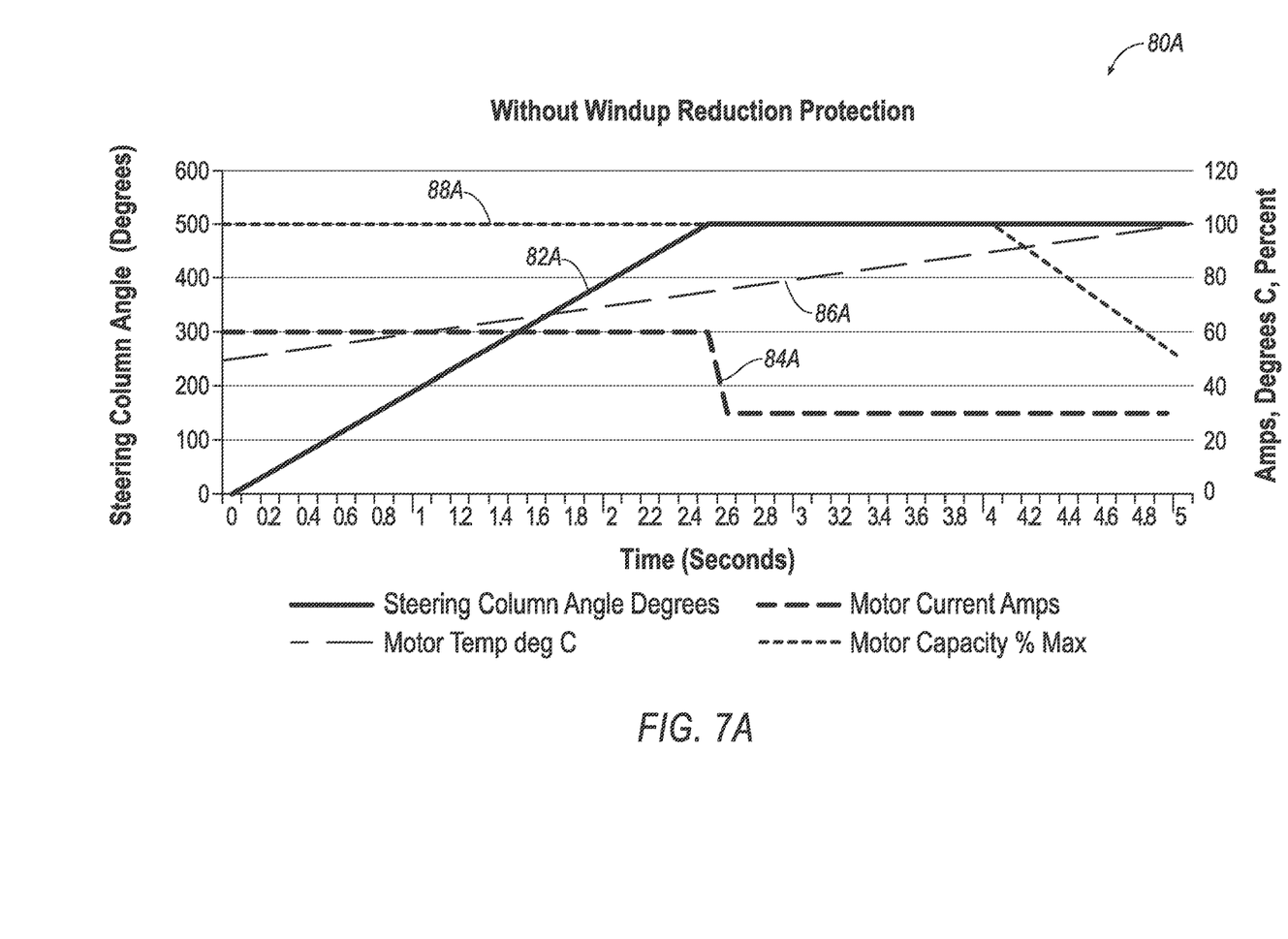
FIG. 7A is an example graph of steering angle, motor current, motor temperature and motor capability as a function of time during a steering load event for each of a system without the example static windup reduction system.
Figure 7B:
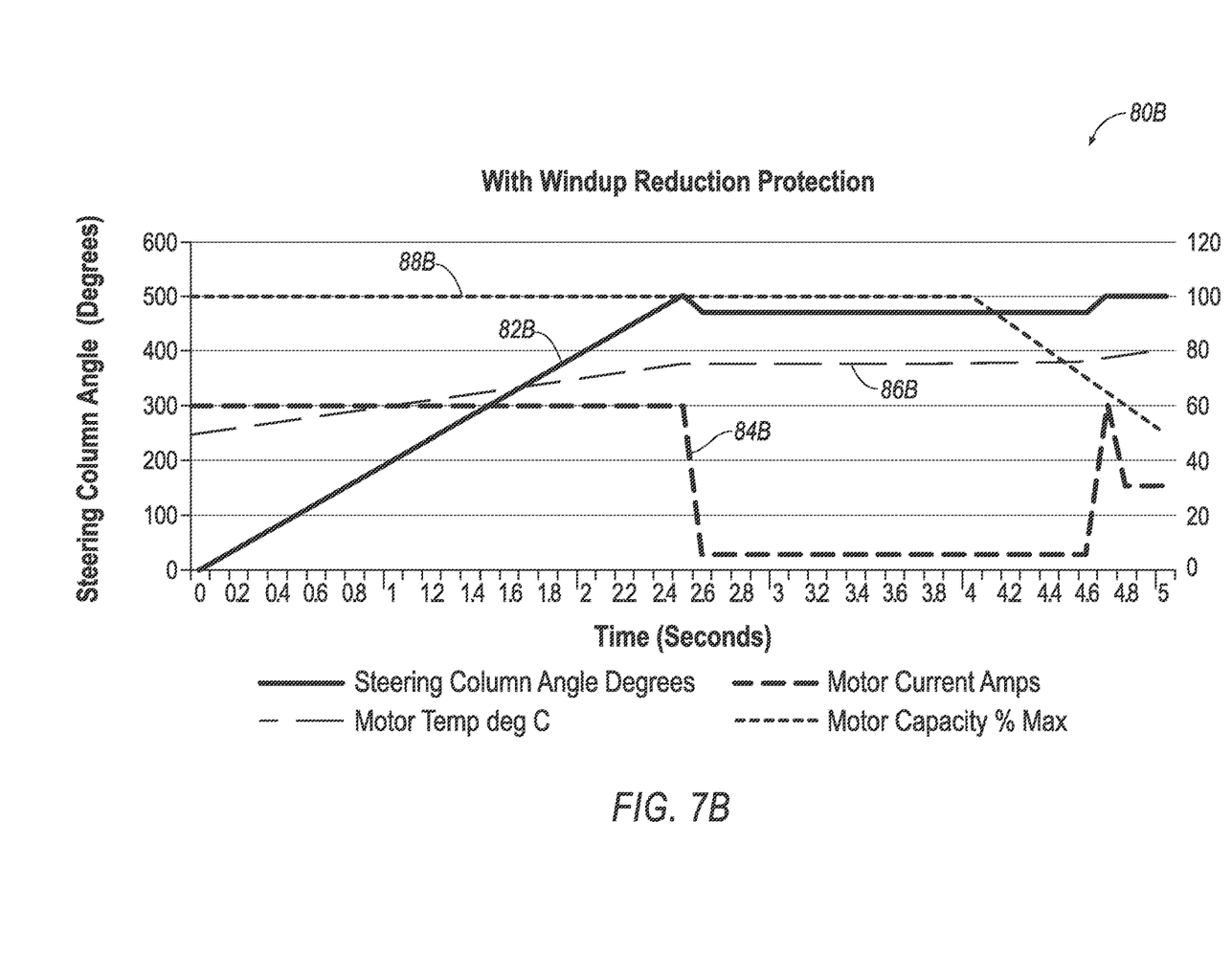
FIG. 7B is an example graph of steering angle, motor current, motor temperature and motor capability as a function of time during a steering load event for each of a system with the example static windup reduction system.

FIG. 7A is an example graph 80A illustrating a motor current draw and an effect on motor performance potential of the steering system 10 not incorporating the process described below. FIG. 7B is an example graph 80B illustrating a motor current draw and an effect on motor performance potential of the steering system 10 incorporating the process described below.

In graph 80A, example plots of steering column angle 82A, motor current 84A, motor temperature 86A and motor capability 88A are illustrated for a system 10 not employing windup reduction protection. Plot 82A represents an angular position of the upper steering column 32 and the lower steering column 28. Each of the columns 28 and 32 rotate with the other. The angular position increases linearly from zero to 500 degrees in a time of 2.5 seconds, and remains at that position for another 2.5 seconds. The road wheel angle α of the wheels 14 varies substantially linearly with the angle of the lower steering column 28. The exact relationship between the angle of the lower steering column 28 and the road wheel angle α of the wheels is determined by the steering gear 21. An example relationship may provide a change in road wheel angle α of 30 degrees with a change in the steering wheel angle of 500 degrees.

The angle of the tire patch 16 will lag the angle of the wheel 14 in a static steering situation by an angle β, as per the above discussion of the structure of the tire 15. An example tire 15 disposed on a high coefficient of friction surface such as concrete may have an example maximum angle β, based on a slip limit for the tire, the vehicle and the ground surface, of three degrees. The windup in the tire 15 requires actuator 26 to sustain a load against the torsional force of the tire 15 to maintain the wheel 14 at the target angle α against the windup torque associated with angle β. Holding this position, as illustrated in graph 80A, has the effects plotted in graph 80A and described below. After achieving 500 degrees of rotation of the steering wheel 30 or the lower steering column, the position of the steering wheel 30 and steering column 28 are maintained for another 2.5 seconds. The wheel 14 is correspondingly being held at an example road wheel angle α of 30 degrees. However, the tire patch 16 is at an example angle of 27 degrees. The three degree difference in angular position of the wheel 14 relative to the tire patch 16 is sustained against an elastic torsional force of the tire 15 by the electric motor of actuator 26. The ECU 56 may estimate a situation-specific value of windup angle β and the maximum windup using available data including values of current drawn by the actuator motor as may be measured by an ammeter (not shown) associated with the electric motor of the steering actuator 26, the steering displacement as measured by the sensor 34, and tire stiffness data. The tire stiffness data may be provided by a tire manufacturer and stored in the memory 64 of the ECU 56. Alternatively, a single generic value of the maximum windup may be developed in laboratory testing, stored in the memory 64 and used by ECU 56 for all circumstances.

The example electric motor of the actuator 26 may draw 60 amps as the wheels 14 are turned from zero degrees to the example 30 degrees. When the steering column 28 reaches its example target of 500 degrees and wheel 14 is at 30 degrees, the demand on the motor of actuator 26 decreases as the actuator is no longer being required to rotatively scrub the tire against the pavement to get the wheel to the target position. While the demand on the motor decreases, it is not eliminated. There is still a need to maintain the wheel 14 at 30 degrees against the windup torque of the tire 15 which demands an example 30 amps for the motor. Consistent with this, plot 84A shows the current initially plateaued at 60 amps, and dropping and holding at 30 amps when the steering column angle reaches 500 degrees.

The energy consumed by the motor of actuator 26 when the actuator 26 is stalled, as against the windup load, generates heat, increasing the temperature of the actuator motor. Plot 86A illustrates the increase in temperature of the motor during the five second of steering illustrated by graph 80A. Even though the current drawn by the actuator motor drops in half to 30 amps after 2.5 seconds, the temperature of the motor continues to increase in a substantially linear fashion at the same rate as when the motor was drawing 60 amps. When the example motor reaches a particular temperature, e.g. 90 degrees Celsius, the motor's performance begins to decay as illustrated by plot 88A. In the illustrated example, the decay in performance occurs rapidly, dropping performance capability from 100% as the temperature approaches 90 degrees, to 50% at 100 degrees Celsius. The illustrated performance decay occurs in approximately one second of time.

In graph 80B, example plots of steering column angle 82B, motor current 84B, motor temperature 86B and motor capability 88B are illustrated for a system 10 employing windup reduction protection. Plot 82B of an angular position of columns 32 and 28 shows angular position increasing linearly from zero to 500 degrees in the first 2.5 seconds of the graph 80B.

The angle of the tire patch 16 will lag the angle of the wheel in a static steering situation by the windup angle β, as per the above discussion of the tire structure. The system of graph 80B is distinguished over the system of graph 80A in that the system of graph 80B reduces the target steering wheel angle from 500 degrees to 470 degrees, i.e. by six percent in this example. The example six percent change in steering wheel angle results in a corresponding change in wheel angle from (rounding to the nearest whole number) 30 degrees to 28 degrees. With this change, the tire patch 16 may remain unmoved, but the windup angle β is reduced to one degree, substantially reducing, e.g., reducing by 92%, the actuator motor load needed to maintain wheel 14 in position against the windup load of the tire 15. Holding this position, as illustrated in graph 80B, has the effects plotted in 80B and described below. When signaled, the actuator 26 restores the steering wheel angle to 500 degrees, and the road wheel angle α to 30 degrees.

The example electric motor of the actuator 26 may draw 60 amps as the wheels 14 are turned from zero degrees to the example 30 degrees. When the target steering wheel angle is set to 470 degrees, the decreased demand on the motor of actuator 26 allows a reduction of current to 5 amps to maintain the wheel at 28 degrees against the greatly reduced windup torque of the tire 15. Plot 84B shows the current initially plateaued at 60 amps, and dropping and holding at 5 amps when the steering column angle reaches 470 degrees. The drop reflects the combination of the termination of motion of actuator 26 and the release of most of the tire windup. In the present example, only 5 amps of current is needed to overcome the residual windup.

Plot 86B illustrates the change in temperature of the motor during the five second of steering illustrated by graph 80B. With the reduction in the road wheel angle α to 28 degrees, current drawn by the actuator motor drops to five amps after 2.5 seconds, the temperature of the motor substantially plateaus at 75 degrees Celsius and remains there until the steering wheel angle is reset to 500 degrees and the motor begins to draw 30 amps of current. As tire rotation is expected to start after the completion of five seconds, the motor never reaches the 90 degrees Celsius mark. By avoiding the 90 degree Celsius mark, the motor's performance never begins to decay, remaining at 100% as illustrated by plot 88B.

ECU 56 may be programmed to relieve an occurrence of tire windup as described above. Two examples of a method or process 90, 120 for vehicle 12 to identify and relieve tire windup are described below.

Processing

Figure 8:
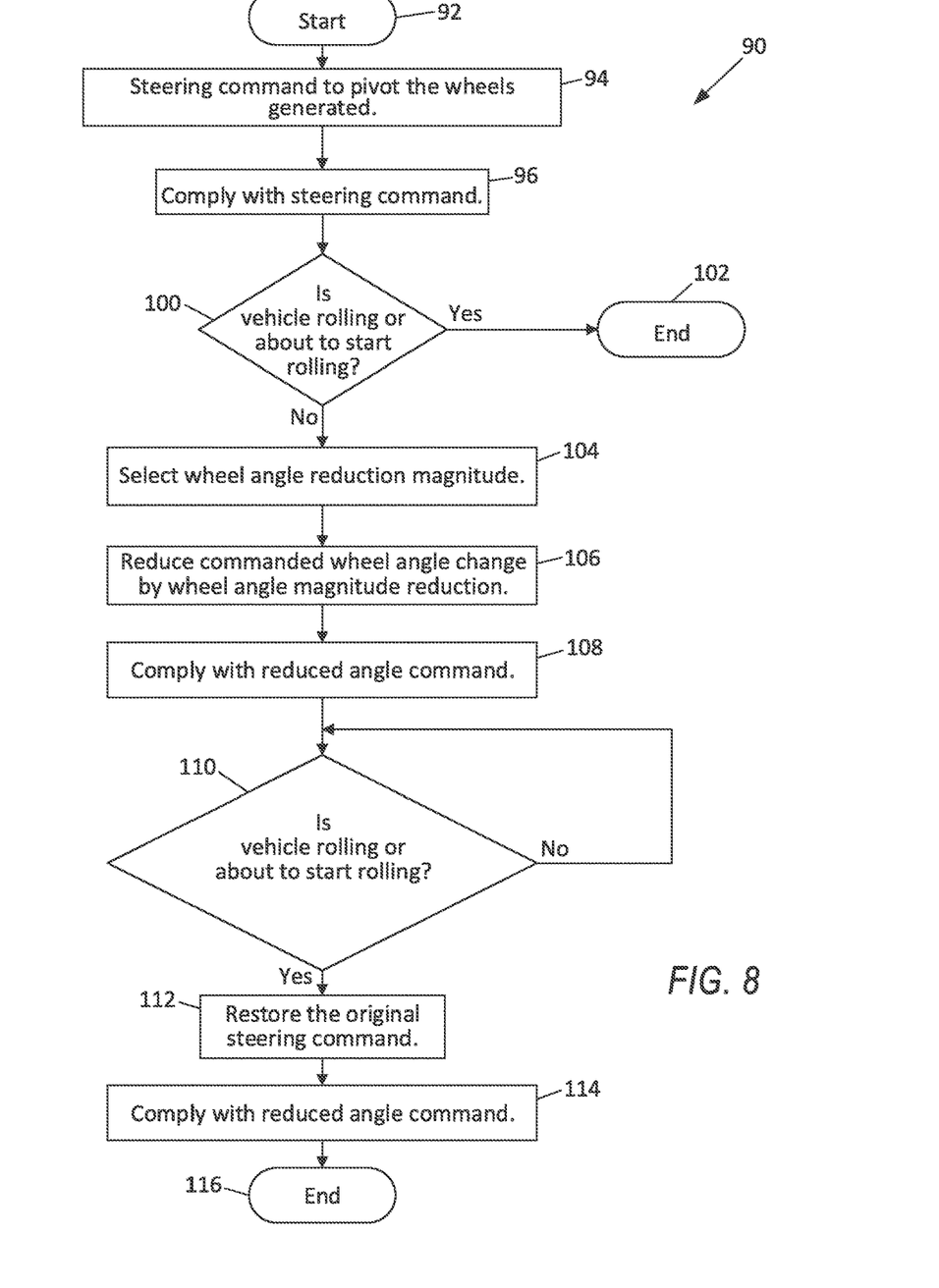
FIG. 8 is an example flowchart of a process executed by the example static windup reduction system.

FIG. 8 illustrates an example tire windup relief process 90 that may be stored in the ECU 56 of vehicle 12. The ECU 56 executes the steps illustrated in FIG. 8 as described below, i.e., statements below that a block executed certain steps means that the ECU 56 stores programming for executing the process 90, 120 including the disclosed step, and can in fact executes the step as part of executing the process 90, 120. A computer program for executing process 90 may be instantiated in start block 92, e.g., when a power-on command is issued, as may be associated with the vehicle being powered up responsive to an approach or a touch by a vehicle passenger.

Next, process block 94 recognizes a steering command to turn wheels 14, i.e., change the road wheel angle α of wheels 14 from a starting position to a first road wheel angle. Following such recognition, process 90 moves to process block 96. Process block 96 energizes the motor of actuator 26, causing wheels 14 to pivot in compliance with the steering command. Such energization may include connecting the motor of actuator 26 with an electrical power supply to provide current to the motor. As part of process block 96, the ECU 56 may confirm execution of the steering command. Such a confirmation may be made using sensor 34 to confirm that the wheels 14 are in the targeted orientation.

Process 90 moves on from process block 96 to decision block 100. Decision block 100 determines whether the vehicle 12 is rolling. Data from wheel speed sensors 74 may be used to determine if vehicle 12 is rolling.

Upon determining that the vehicle 12 is rolling, process 90 moves to end block 102 and terminates. Upon determining that the vehicle 12 is not rolling, i.e., is stationary, process 90 moves to process block 104 which selects a wheel angle reduction magnitude. An example reduction magnitude made depend on above-discussed factors, such as the slip limit.

Following process block 104, process block 106 reduces the commanded wheel angle target position by the selected wheel angle reduction magnitude to achieve a second road wheel angle. An example reduction magnitude may be two degrees, more than half of the example maximum windup of three degrees, when the initial command is an angular displacement of more than 30 degrees, and the tires are disposed on dry cement. That would yield a shift in the command from 30 degrees to 28 degrees. Process block 108, after process block 106, complies with the reduced angle command. The angle reduction reduces the tire windup, and allows a reduction in current to the motor of the actuator 26 as illustrated by plot 84B of FIG. 7B. Effective relief may be obtained by selecting as a wheel angle reduction magnitude a value in a range between one half and one and a half of the maximum windup, particularly when the tire 15 in the first angular position is at maximum windup.

After block 108, process 90 moves to decision block 110 which determines whether the vehicle has started rolling or is about to start rolling. Anticipation of vehicle movement is possible when vehicle 12 is operating in an autonomous mode. For example, vehicle-to-infrastructure communication may be employed to allow the vehicle 12 to communicate with a traffic signal. The vehicle will, through such communication, be able to anticipate a change in the signal from a "stop" signal to a "go" signal.

When it is determined that the vehicle 12 is not rolling and is not yet about to start rolling, process 90 cycles back to decision block 110 to continue checking. When it is determined by decision block 110 that the wheels 14 of vehicle 12 are about to start rolling or are already rolling, i.e., that vehicle motion is incipient or already initiated, process 90 moves to process block 112. Process block 112 restores the original steering angle command as a final road wheel angle.

The final road wheel angle is the road wheel angle α the wheel will be held at when vehicle motion resumes. Process block 114, after process block 112, complies with the increased angle command, consistent with plot 84B at 4.7 seconds. The angle is eliminated, with the wheels 14 returning to the original command position. The current draw increases, but only briefly as the vehicle begins moving before the temperature of the motor increases significantly. Following such execution, process 90 moves to end block 116 and terminates.

Figure 9:
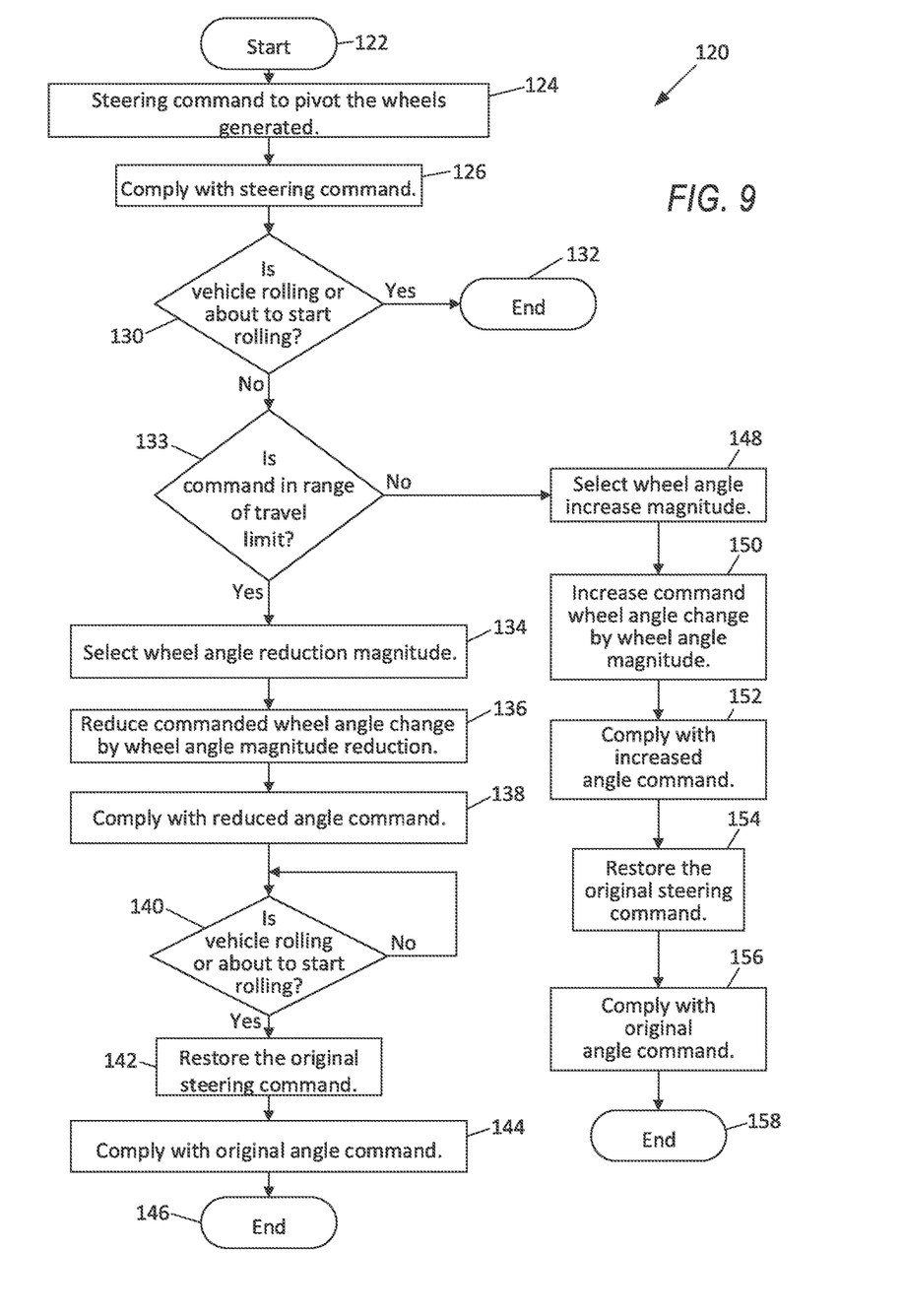
FIG. 9 is an example flowchart of a process alternative to the process of FIG. 8 that is executed by the example static windup reduction system.

FIG. 9 illustrates an example tire windup relief process 120 that may, like process 90, be stored in ECU 56 of vehicle 12. Process 120 is distinguished from process 90 in that, in some instances, a command is given to first increase the commanded steering angle beyond the initial target and then decreasing the angle. The combination of overshoot and reduction reduces windup and leaves the wheel 14 positioned at the desired target position. ECU 56 executes the steps illustrated in FIG. 9 as described below. A computer program for executing process 120 may be instantiated in start block 122, e.g., when a power-on command is issued, as may be associated with the vehicle being powered up responsive to an approach or a touch by a vehicle passenger.

Next, process block 124 recognizes a steering command to turn wheels 14, i.e., change the road wheel angle α of wheels 14 from a starting position to a first road wheel angle. Following such recognition, process 120 moves to process block 126. Process block 126 energizes the motor of actuator 26, causing wheels 14 to pivot in compliance with the steering command. Such energization may include connecting the motor of actuator 26 with an electrical power supply to provide current to the motor. As part of process block 126, the ECU may confirm execution of the steering command. Such confirmation may be made using sensor 34 to confirm that the wheels 14 are in the targeted orientation.

Process 120 moves on from process block 126 to decision block 130. Decision block 130 determines whether the vehicle 12 is rolling. Data from wheel speed sensors 74 may be used to determine if vehicle 12 is rolling.

Upon determining that the vehicle 12 is rolling, process 120 moves to end block 132 and terminates. Upon determining that the vehicle 12 is not rolling, i.e., is stationary, process 120 moves to decision block 133 which determines if the steering command of process block 124 command is in range of a travel limit. An example travel limit may be a characteristic of the steering gear 21, as when the pinion gear 22 reaches the last tooth in the rack 24. An example range may equal an anticipated change in road wheel angle α needed to reduce tire windup of sufficient magnitude to prevent a diminution of performance of the electric motor of actuator 26. For example, if a has a possible range between travel limits of ±30 degrees, and if the change in angle needed to sufficiently reduce windup is 2 degrees, the command would be in range of the travel limit if the command would result in the final position of the wheels being more than 28 degrees from the longitudinal axis.

When the command of process block 124, i.e., the target road wheel angle α is in the range of the travel limit, process 120 moves to process block 134 which selects a wheel angle reduction magnitude to achieve a second road wheel angle. An example reduction magnitude made depend on above-discussed factors, such as the slip limit.

Following process block 134, process block 136 reduces the commanded wheel angle target position by the selected wheel angle reduction magnitude to a second road wheel angle. An example reduction magnitude may be two degrees, more than half of the example maximum windup of three degrees, when the initial command is an angular displacement of more than 30 degrees, and the tires are disposed on dry cement. That would yield a shift in the command from 30 degrees to 28 degrees. Process block 138, after process block 136, complies with the reduced angle command. The angle reduction reduces the tire windup, and allows a reduction in current to the motor of the actuator 26 as illustrated by plot 84B of FIG. 7B. Effective relief may be obtained by selecting as a wheel angle reduction magnitude a value in a range between one half and one and a half of the maximum windup, particularly when the tire 15 in the first angular position is at maximum windup.

After block 138, process 120 moves to decision block 140 which determines whether the vehicle has started rolling or is about to start rolling. As discussed above, anticipation of vehicle movement is possible when vehicle 12 is operating in an autonomous mode.

When it is determined that the vehicle 12 is not rolling and is not yet about to start rolling, process 120 cycles back to decision block 140 to continue checking. When it is determined by decision block 140 that the vehicle 12 is rolling or about to start rolling, process 120 moves to process block 142. Process block 142 restores the original steering angle command as a final road wheel angle. Process block 144, after process block 142, complies with the increased angle command, consistent with plot 84B at 4.7 seconds. The angle is eliminated, with the wheels 14 returning to the original command position. The current drawn by the actuator motor increases, but only briefly as the vehicle begins moving before the temperature of the motor increases significantly. Following such execution, process 120 moves to end block 146 and terminates.

When decision block 133 determines that the command is not in range of the travel limit, process 120 moves to process block 148. Process block 148 selects a wheel angle increase magnitude. The wheel angle increase magnitude may be determined in the same manner as the wheel angle reduction magnitude as set forth above, and is expected to be substantially equal to the wheel angle reduction magnitude.

Process 120 then moves to process block 150. Process block 150 increases the commanded wheel angle by the wheel angle increase magnitude. In an example in which an initial target wheel angle α or first road wheel angle is 20 degrees, the wheel angle would be commanded to an intermediate road wheel angle of 22 degrees. Process block 150 is followed by process block 152 which requires compliance with the increased angle command. The actuator motor is energized to position wheel 14 at 22 degrees.

Having achieved a wheel angle of 22 degrees, the process 120 moves to process block 154 which restores the original steering command. Continuing with the above example, the steering command would be reset to 20 degrees, a second and final road wheel angle. Process step 156, following process step 154, complies with the command, energizing the actuator motor to move the wheel to 20 degrees. The result of this initial overshoot of the target and then resetting to the initial target is the desired elimination of tire windup. The system 10 is thus able to sustain the wheels 14 at the target angle α value of 20 degrees without overheating the actuator motor.

With the wheels being held at the target angle value a, process 120 is able to move to end block 158 and to terminate.

CONCLUSION

An example system and method for unloading a vehicle's steering actuator during a static steering maneuver has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

What is claimed is:

1. A computing device, programmed to:
pivot a wheel of a vehicle to a first road wheel angle relative to a starting position;
pivot the vehicle wheel to a second road wheel angle calculated to reduce a tire windup upon determining that the vehicle is stationary; and
pivot the vehicle wheel to a final road wheel angle upon determining that a vehicle motion is one of incipient and initiated.

2. The computing device of claim 1, further programmed to keep the vehicle stationary while the vehicle wheel is being pivoted.

3. The computing device of claim 1, further programmed to determine when motion is to be initiated.

4. The computing device of claim 1, further programmed to calculate the second road wheel angle using steering position data and motor current data.

5. The computing device of claim 1, wherein the second road wheel angle is less than the first road wheel angle by an angle between one half of a maximum windup and one and a half times the maximum windup.

6. The computing device of claim 1, wherein the final road wheel angle equals the first road wheel angle.

7. The computing device of claim 1, wherein the final road wheel angle equals the second road wheel angle and the computing device is further programmed to pivot the vehicle wheel to an intermediate road wheel angle having an angle between one half of a maximum windup and one and a half times the maximum windup, before pivoting to the second road wheel angle.

8. The computing device of claim 7, further programmed to pivot the vehicle wheel to the intermediate road wheel angle after the first road wheel angle is reached and to the second road wheel angle after the intermediate road wheel angle is reached.

9. The computing device of claim 1, further programmed to:
upon determining that the first road wheel angle is not in range of a travel limit:
set the first road wheel angle, the second road wheel angle and the final road wheel angle equal to each other, and
pivot the vehicle wheel beyond the first road wheel angle to an intermediate road wheel angle having an angle between one half of a maximum windup and one and a half times the maximum windup before pivoting to the second road wheel angle; and
upon determining that the first road wheel angle is in range of the travel limit:
set the final road wheel angle equal to the first road wheel angle, and
set the second road wheel angle less to an angle than the first road wheel angle by an angle between one half times a maximum windup and one and a half times the maximum windup.

10. The computing device of claim 1, further programmed to pivot the vehicle wheel to the second road wheel angle after first the road wheel angle is reached.

11. A method of reducing a tire windup load on a vehicle steering actuator, the method comprising the steps of:
pivoting a wheel of a vehicle to a first road wheel angle relative to a starting position;
pivoting the vehicle wheel to a second road wheel angle calculated to reduce a tire windup upon determining that the vehicle is stationary; and
pivoting the vehicle wheel to a final road wheel angle upon determining that a vehicle motion is one of incipient and initiated.

12. The method of claim 11, further comprising the step of keeping the vehicle stationary while the vehicle wheel is being pivoted.

13. The method of claim 11, further comprising the step of determining when motion is to be initiated.

14. The method of claim 11, further comprising the step of calculating the second road wheel angle using steering position data and motor current data.

15. The method of claim 11, wherein the second road wheel angle is less than the first road wheel angle by an angle between one half of a maximum windup and one and a half times the maximum windup.

16. The method of claim 11, wherein the final road wheel angle equals the first road wheel angle.

17. The method of claim 11, wherein the final road wheel angle equals the second road wheel angle and further comprising the step of pivoting the vehicle wheel to an intermediate road wheel angle having an angle between one half of a maximum windup and one and a half times the maximum windup, before pivoting to the second road wheel angle.

18. The method of claim 17, further comprising the steps of:
pivoting the vehicle wheel to the intermediate road wheel angle after the first road wheel angle is reached; and
pivoting the vehicle wheel to the second road wheel angle after the intermediate road wheel angle is reached.

19. The method of claim 11, further comprising the steps of:
upon determining that the first road wheel angle is not in range of a travel limit:
setting the first road wheel angle, the second road wheel angle and the final road wheel angle equal to each other, and
pivoting the vehicle wheel beyond the first road wheel angle to an intermediate road wheel angle having an angle between one half of a maximum windup and one and a half times the maximum windup before pivoting to the second road wheel angle; and
upon determining that the first road wheel angle is in range of the travel limit:
setting the final road wheel angle equal to the first road wheel angle, and
setting the second road wheel angle less to an angle than the first road wheel angle by an angle between one half times a maximum windup and one and a half times the maximum windup.

20. The method of claim 11, further comprising the step of pivoting the vehicle wheel to the second road wheel angle after first the road wheel angle is reached.

* * * * *